(12) United States Patent
Venuto et al.

(10) Patent No.: US 7,731,257 B2
(45) Date of Patent: Jun. 8, 2010

(54) COLLISION MANAGEMENT SYSTEM FOR COMPARTMENT-MOUNTED AUTOMOTIVE SPARE TIRE

(75) Inventors: Jonathan Venuto, Boston, MA (US); John Fazio, Dearborn, MI (US); Kirk Arthurs, Newport, MI (US); Jason Prior, Berkley, MI (US)

(73) Assignee: Ford Global Technologies, Dearborn, MI (US)

( * ) Notice: Subject to any disclaimer, the term of this patent is extended or adjusted under 35 U.S.C. 154(b) by 929 days.

(21) Appl. No.: 11/534,231

(22) Filed: Sep. 22, 2006

(65) Prior Publication Data

US 2008/0073390 A1    Mar. 27, 2008

(51) Int. Cl.
*B62D 43/10*    (2006.01)
(52) U.S. Cl. .................................. 296/37.2; 296/187.11
(58) Field of Classification Search ................. 296/37.2, 296/187.11
See application file for complete search history.

(56) References Cited

U.S. PATENT DOCUMENTS

| 3,595,335 | A | | 7/1971 | Wessells |
| 3,845,977 | A | | 11/1974 | Eshelman |
| 3,866,962 | A | | 2/1975 | Eshelman |
| 4,533,169 | A | | 8/1985 | Rauthmann et al. |
| 5,275,436 | A | | 1/1994 | Pomero |
| 5,348,113 | A | | 9/1994 | Drvota et al. |
| 5,419,609 | A | * | 5/1995 | Kmiec et al. ............ 296/187.11 |
| 6,672,639 | B2 | * | 1/2004 | Kosuge et al. ............. 296/37.2 |
| 7,270,365 | B2 | * | 9/2007 | Suzuki et al. .......... 296/187.08 |

* cited by examiner

*Primary Examiner*—Joseph D Pape
(74) *Attorney, Agent, or Firm*—Jerome R. Drouillard; Greg Brown

(57) ABSTRACT

A collision management system for an automotive spare tire includes a pneumatic spare tire mounted upon a wheel, and a body structure for axially displacing the spare tire in the direction of a combination tire deflator and wheel retainer which engages the spare tire and pierces it to deflate the spare tire, while subsequently locking upon the wheel rim, so as to assist in retaining the spare tire in a desired location within a storage compartment of the vehicle.

13 Claims, 4 Drawing Sheets

COLLISION MANAGEMENT SYSTEM FOR COMPARTMENT-MOUNTED AUTOMOTIVE SPARE TIRE

BACKGROUND OF THE INVENTION

1. Field of the Invention

The present invention relates to a system and method for managing impact against a spare tire mounted and carried within a compartment of a motor vehicle.

2. Disclosure Information

The handling of a spare tire during an impact event against a motor vehicle presents a challenge to vehicle designers because a spare tire, including a tire and wheel, possesses a good deal of column strength, which if not accounted for properly, could constrict the ability of the vehicle to absorb collision energy by crushing axially. Earlier collision management work involving spare tires, such as that evidenced in U.S. Pat. No. 4,533,169, uses the rim of a spare wheel to brace the floor of a vehicle against excessive deformation, so as to protect a fuel tank adjacent to the vehicle's floor. The purpose of the present invention is otherwise—here it is desired to prevent a spare tire from playing a significant role in the absorption of energy during a collision.

A method and system according to the present invention effectively removes the spare tire from the plastic deformation component of crash energy management by assuring that the spare tire is both rapidly deflated and prevented from relocating within a storage compartment during an impact event.

SUMMARY OF THE INVENTION

A collision management system for an automotive spare tire includes a spare tire having a pneumatic tire mounted upon a wheel, with the spare tire being stowed within an automotive vehicle compartment. A body structure displaces the spare tire in the event of an impact directed axially against the compartment and having sufficient force to deform the compartment. A combination tire deflator and wheel retainer mounted within the compartment sequentially breaches the tire and clamps the wheel to a surface of the compartment in response to axial displacement of the spare tire. In a further embodiment, the spare tire is mounted generally horizontally within a luggage compartment of a vehicle by means of a hold down mechanism.

As a control measure, the combination tire deflator and wheel retainer sequentially breaches the tire and clamps the wheel only in the event that the spare tire has been displaced axially beyond a predetermined threshold.

According to a preferred embodiment of the present invention, a combination tire deflator and wheel retainer comprises a unitary structure having a cutter portion and a hook portion. The unitary structure may be advantageously formed as a metallic stamping either bolted or welded to a floor pan of the vehicle.

The combination cutter and hook assembly projects upwardly from the floor of the vehicle in the direction of the spare tire such that the cutter portion will compress and impinge upon, and then cut through, the tire before the hook portion of the combination cutter and hook assembly engages the wheel. In this manner, after the tire is cut and the air is released, the hook portion will cooperate with the hold down mechanism to maintain the spare tire in its stowed position during the impact event.

According to another aspect of the present invention, a collision management method for a spare tire mounted within a compartment of a motor vehicle includes permitting the spare tire to move freely with respect to a combination tire deflator and wheel retainer during the first part of an impact event, and then impinging upon a tire portion of the spare tire with a cutter portion of the combination tire deflator and wheel retainer, followed by cutting the tire portion open with the cutter portion, and then permitting the spare tire to move closer to the combination tire deflator and wheel retainer such that a wheel portion of the spare tire becomes engaged with a hook portion of the combination deflator and wheel retainer.

It is an advantage of the present method and system that an automobile spare tire may be quickly deflated and restrained from moving about a storage compartment of a vehicle during a collision impact event.

It is yet another advantage of the present method and system that a combination tire deflator and wheel retainer requires little space within a storage compartment, and is activated by displacement of the spare tire, without the need for any type of control device.

Other advantages, as well as features and objects of the present invention, will become apparent to the reader of this specification.

DETAILED DESCRIPTION OF THE PREFERRED EMBODIMENTS

Figure 1:
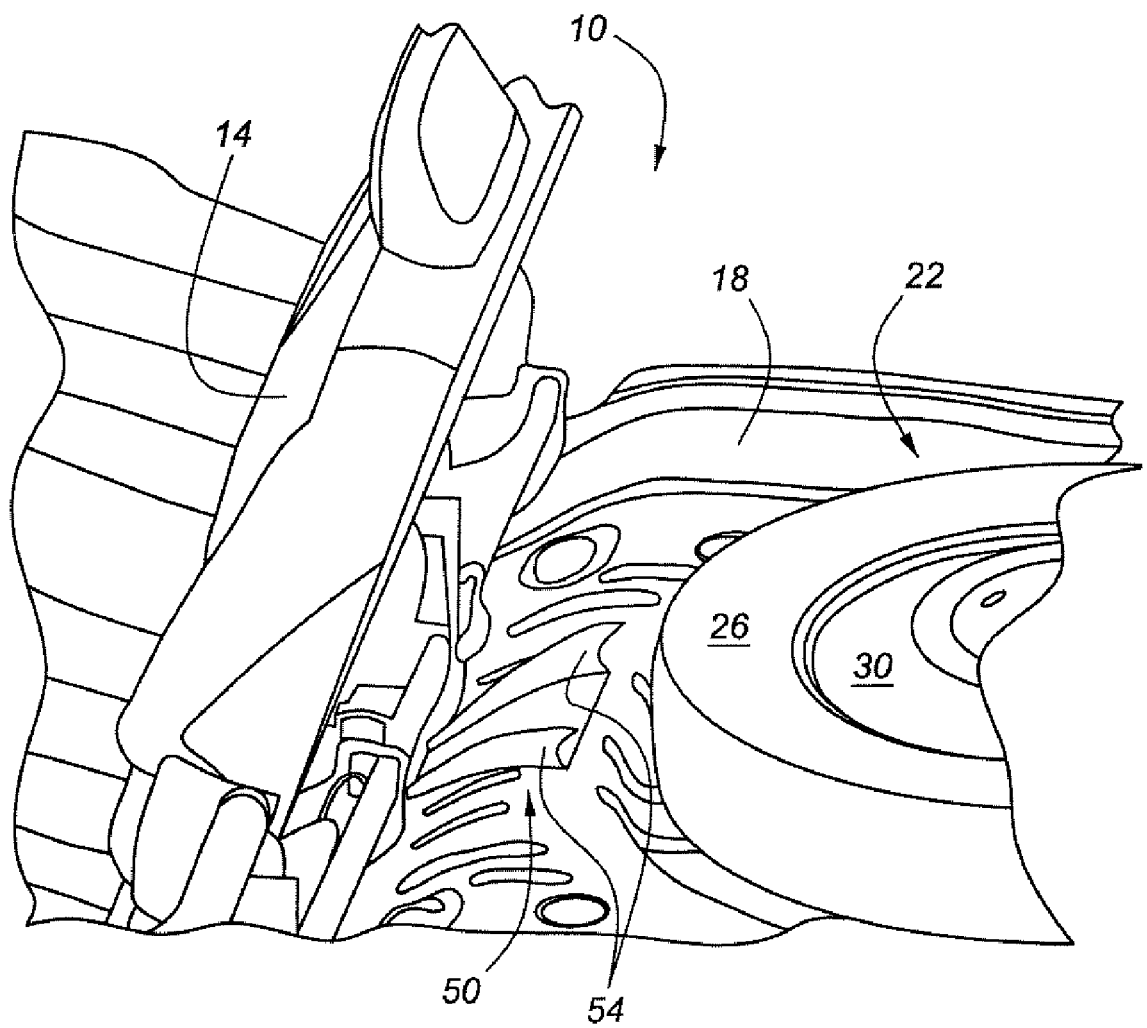
FIG. 1 is a perspective view of an automotive vehicle having a spare tire collision management system according to the present invention.
Figure 6:
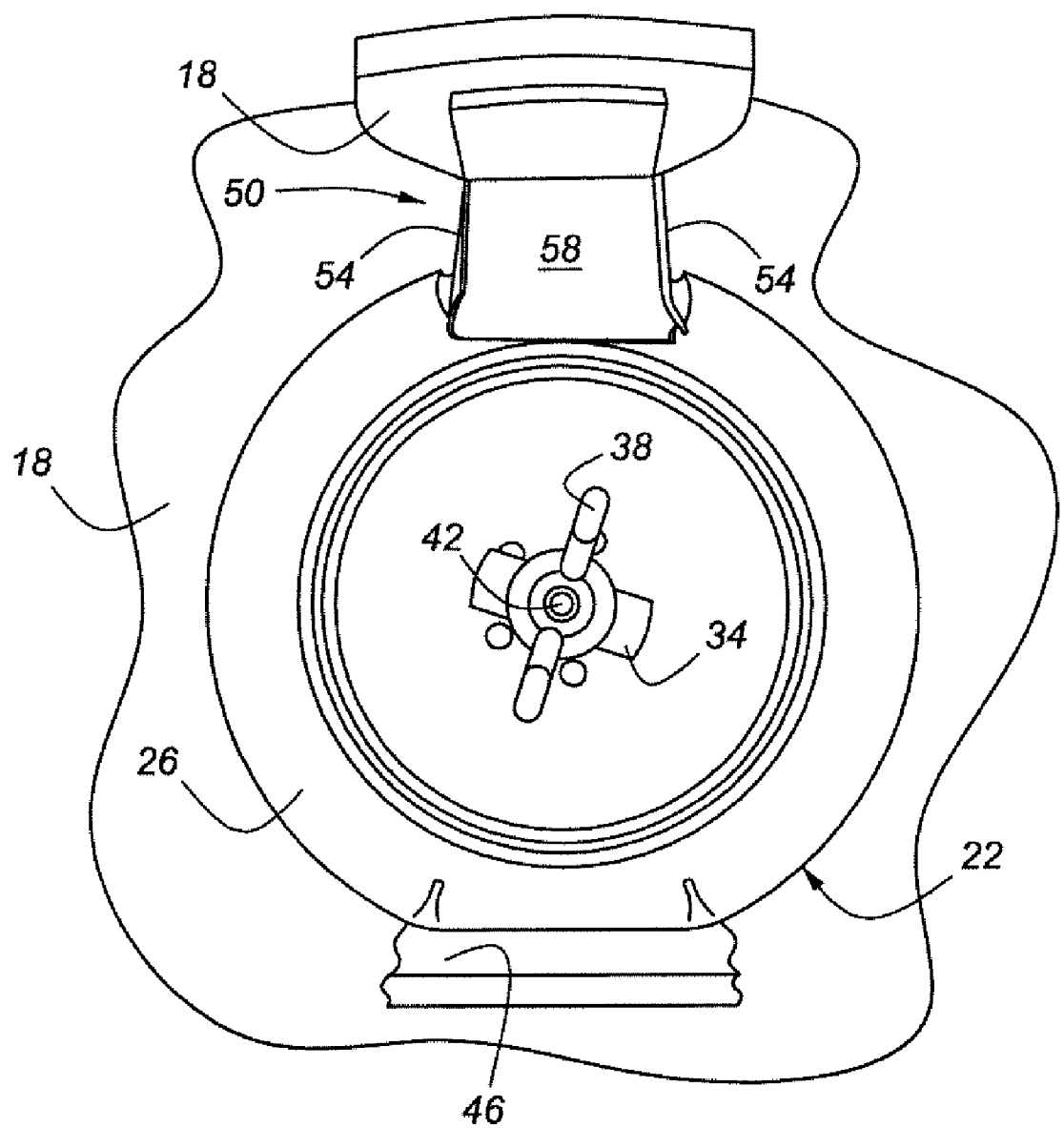
FIG. 6 is a plan view showing a wheel and tire assembly, as well as a hold down used for normal mounting of the spare tire assembly, following an impact event.

As shown in FIG. 1, vehicle 10 has a number of seats, 14, which are located in a passenger compartment extending forward from a luggage compartment having a floor pan, 18. Spare tire assembly 22 is mounted upon floor pan 18 within the luggage compartment, using a hold down bracket, 34, and a wing nut, 38, which are attached as shown in FIG. 6, to a stud, 42, which is fastened to floor pan 18. Hold down bracket 34, stud 42, and wing nut 38 perform the function of normally anchoring or mounting spare tire 22 within the vehicle compartment extending behind seats 14. Those skilled in the art will appreciate in view of this disclosure, moreover, that the present collision management system could be employed in a forward compartment of a motor vehicle as well as in a traditional rear luggage compartment or trunk. Moreover, several types of commonly employed mounting mechanisms for spare tire assembly 22 are compatible with a system according to the present invention.

As shown in the various figures, spare tire assembly 22 includes a tire, 26, of conventional construction for spare tires and constructed as either a conventional tire, or a so-called space saver tire. In any event, tire 26 is inflated with a gas such as air, nitrogen, or any other commonly employed tire inflation agent. Spare tire assembly 22 is located longitudinally forward of body cross beam 46, which may comprise either a structure employed as part of floor pan 18, or an upper back panel, or other automotive frame or body structure which moves longitudinally forward against spare tire assembly 22 in the event of an impact which is both directed at least generally axially against the compartment having floor pan 18 and having sufficient force to deform the compartment, including floor pan 18.

The various figures show a combination tire deflator and wheel retainer, 50, which includes a base, 58, and combination cutter and hook assemblies, 54, which project upwardly from base 58 and floor pan 18, and into the direction of spare tire assembly 22. Combination tire deflator and wheel retainer 50 is fastened to floor pan 18 by conventional techniques such as by welding, or bonding, or by threaded fasteners. As may be seen most easily from FIG. 2, each of combination cutter and hook assemblies 54 includes a cutter portion 62, and a hook portion 66. The cutter and hook assemblies 54 are splayed outwardly in the plan view so as to not only cut open tire 26 in the event of an impact having appropriate magnitude and displacement capability, but also to hold the resulting apertures cut into the tire in an open position so as to allow ready deflation of tire 26. Combination tire deflator and wheel retainer 50 may be formed advantageously as a unitary structure, from either metallic, or non-metallic, or composite material, by means of stamping, welding, or molding processes known to those skilled in the art and suggested by this disclosure.

Figure 2:
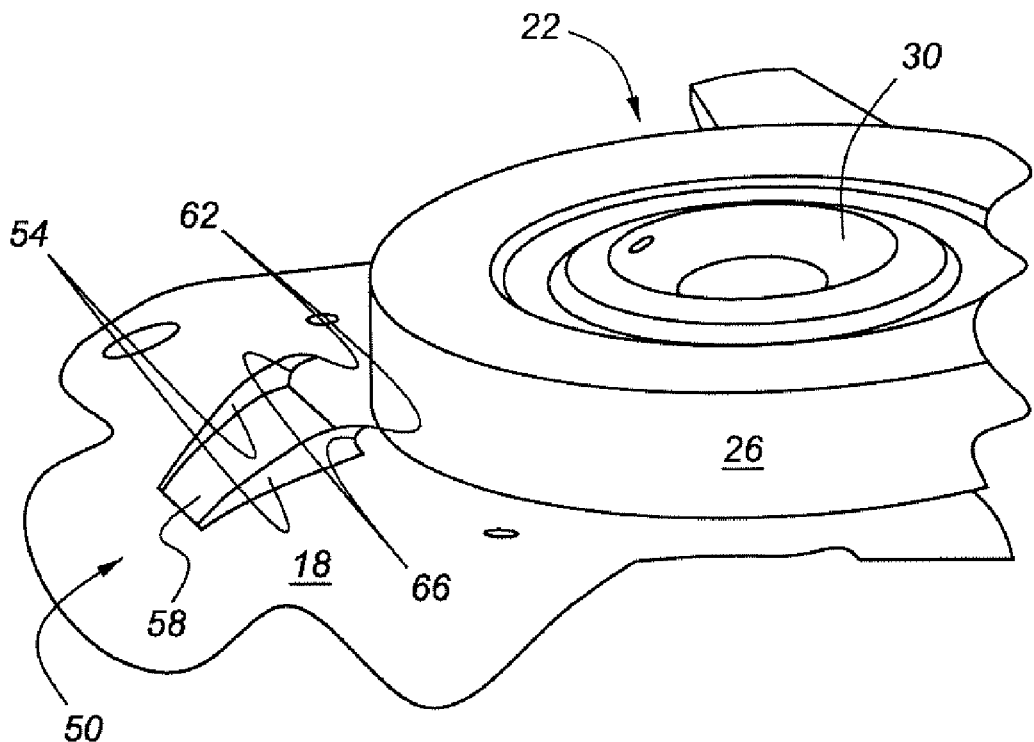
FIG. 2 is a perspective view showing a spare tire assembly and combination tire deflator and wheel retainer in a normal position prior to any impact event.
Figure 3:
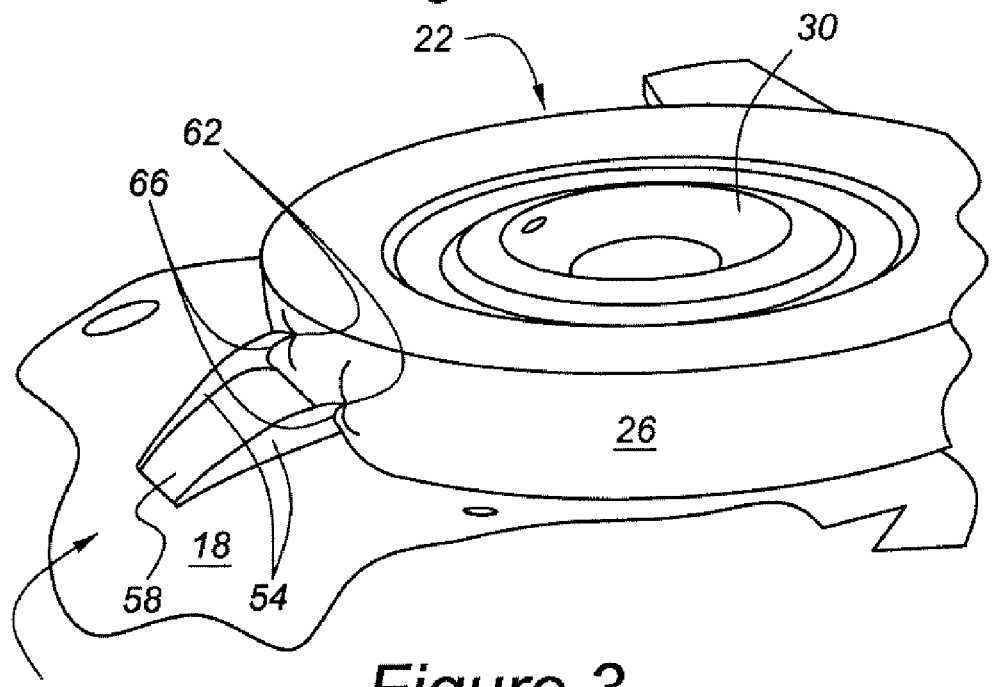
FIG. 3 illustrates the relative positions of a combination tire deflator and wheel retainer and spare tire when impingement of the tire upon a cutter portion of the combination deflator and retainer has begun.
Figure 4:
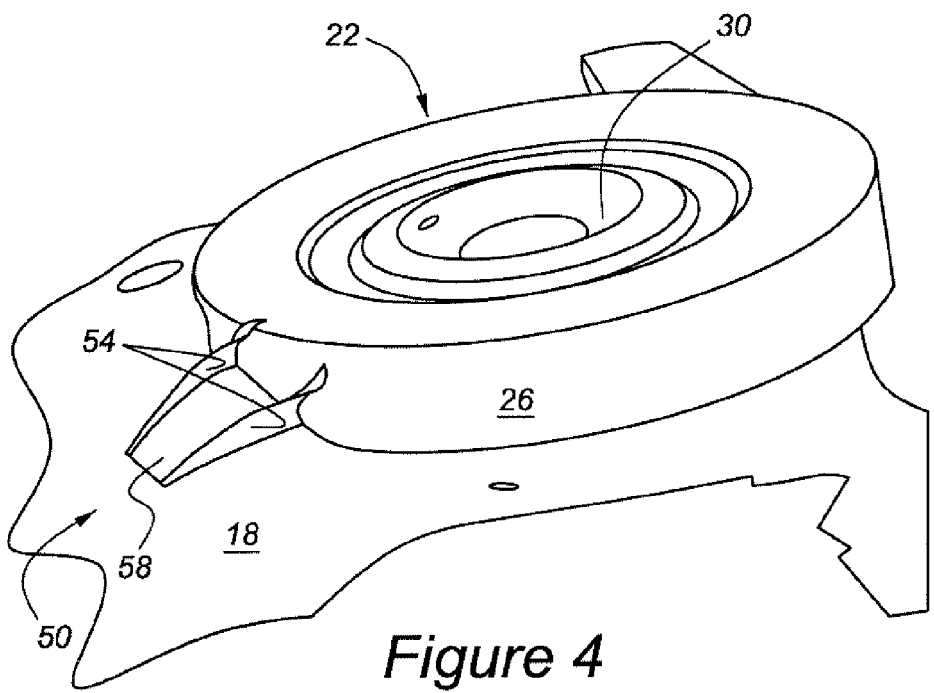
FIG. 4 shows a spare tire as deflation is occurring.
Figure 5:
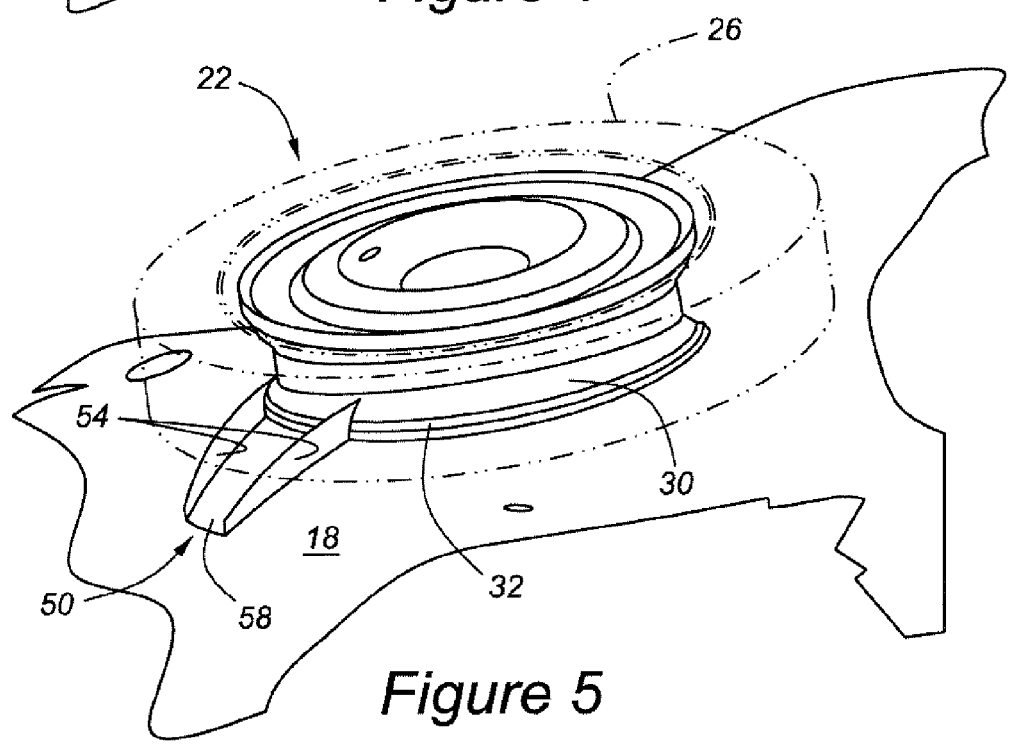
FIG. 5 illustrates a spare tire after it has become fully engaged with a retainer portion of the combination tire deflator and wheel retainer.

As shown in FIG. 2, tire 26, which is a portion of spare tire assembly 22, is normally located at a sufficient distance from cutter portion 62 that impingement illustrated in FIG. 3 will not occur. Accordingly, FIG. 3 shows cutter portions 62 as having impinged upon tire 26 as a result of impact-induced deformation of floor pan 18. At FIG. 4, cutter portions 62 have pierced through and cut open tire 26 so as to allow the pressurized air or other gas within tire 26 to escape. As shown in FIG. 5, axial displacement of spare tire assembly 22 with respect to the portion of floor pan 18 carrying combination tire deflator and wheel retainer 50 continues with the further deformation of floor pan 18 until tire bead 32 of wheel 30 will eventually come into contact with hook portion 66 of combination cutters 54, and at this time, wheel 30, as well as tire 26, will be restrained and retained upon floor pan 18 by the combined action of combination tire deflator and wheel retainer 50 and hold down bracket 34. This will have the effect of preventing spare tire assembly 22 from becoming dislodged and migrating to an unwanted part of the luggage compartment.

In effect, the sequence illustrated in FIGS. 2-5 is a method for managing a spare tire during a collision characterized by a significant axially-directed impact against a vehicle. Each of the steps in this method, such as permitting the spare tire to move freely with respect to the combination tire deflator and wheel retainer, and allowing impingement upon the tire portion of the spare tire with the cutter portion of the combination deflator and retainer, followed by cutting the tire and retaining the wheel portion by means of the combination deflator and retainer all proceed sequentially without the need for any control devices.

While particular embodiments of the invention have been shown and described, numerous variations and alternate embodiments will occur to those skilled in the art. Accordingly, it is intended that the invention be limited only in terms of the appended claims.

What is claimed is:

1. A collision management system for an automotive spare tire, comprising:

a spare tire, comprising a pneumatic tire mounted upon a wheel, with said spare tire being stowed within an automotive vehicle compartment;

a body structure for displacing said spare tire in the event of an impact directed against said compartment and having sufficient force to deform said compartment; and a combination tire deflator and wheel retainer mounted within said compartment, with said combination tire deflator and wheel retainer sequentially breaching said tire and clamping said wheel to a surface of said compartment in response to axial displacement of said spare tire.

2. A collision management system according to claim 1, wherein said spare tire is mounted generally horizontally within a luggage compartment of a vehicle.

3. A collision management system according to claim 1, wherein said spare tire is retained within a luggage compartment of a vehicle by means of a hold down mechanism.

4. A collision management system according to claim 1, wherein said combination tire deflator and wheel retainer sequentially breaches said tire and clamps said wheel only in the event that said spare tire is displaced axially beyond a predetermined threshold.

5. A collision management system according to claim 1, wherein said combination tire deflator and wheel retainer is mounted to the floor of said compartment at a location longitudinally in front of said spare tire.

6. A collision management system according to claim 1, wherein said combination tire deflator and wheel retainer comprises a unitary structure having a cutter portion and a hook portion.

7. A collision management system according to claim 1, wherein said combination tire deflator and wheel retainer comprises a metallic stamping having a cutter portion and a hook portion.

8. A collision management system for an automotive spare tire, comprising:

a spare tire, comprising a pneumatic tire mounted upon a wheel, with said spare tire being stowed within an automotive vehicle compartment by means of a hold down mechanism;

at least one body structure for axially displacing said spare tire in the event of an external impact directed axially against said compartment and having sufficient force to deform said compartment; and a combination tire deflator and wheel retainer mounted to the floor of said compartment, with said combination tire deflator and wheel retainer configured to sequentially breach said tire and clamp said wheel and deflated tire to the floor of said compartment in response to axial displacement of said spare tire beyond a predetermined threshold.

9. A collision management system according to claim 8, wherein said combination tire deflator and wheel retainer comprises a base attached to the floor of said compartment, and at least one combination cutter and hook assembly attached to said base and projecting upwardly from said floor in the direction of said spare tire such that a cutter portion of the combination cutter and hook assembly will compress, impinge upon, and cut through said tire before a hook portion of the combination cutter and hook assembly engages said wheel.

10. A collision management system according to claim 9, wherein said combination tire deflator and wheel retainer comprises a plurality of combination cutter and hook assemblies.

11. A collision management system according to claim 8, wherein said combination tire deflator and wheel retainer comprises a plurality of combination cutter and hook assemblies which are oriented to not only cut through said tire, but also to displace the cut portions, so as to more rapidly deflate said tire.

12. A collision management system according to claim 8, wherein said combination tire deflator and wheel retainer cooperates with said hold down mechanism to maintain said spare tire in its stowed position during an impact event.

13. A collision management method for a spare tire mounted within a compartment of a motor vehicle, comprising:

permitting the spare tire to move freely with respect to a combination tire deflator and wheel retainer during a first part of an impact event;

impinging upon a tire portion of the spare tire with a cutter portion of said combination tire deflator and wheel retainer during a later part of an impact event;

cutting said tire portion open with said cutter portion during a later part of an impact event following said impingement; and permitting the spare tire to move closer to said combination tire deflator and wheel retainer during subsequent impact-driven deformation of the compartment, such that a wheel portion of said spare tire becomes engaged with a hook portion of said combination deflator and wheel retainer.

\* \* \* \* \*